A. J. BAKER.
MEANS INCREASING CUTTER EFFICIENCY.
APPLICATION FILED JAN. 15, 1914.
1,093,581.
Patented Apr. 14, 1914.
3 SHEETS—SHEET 3.
FIG. 5.
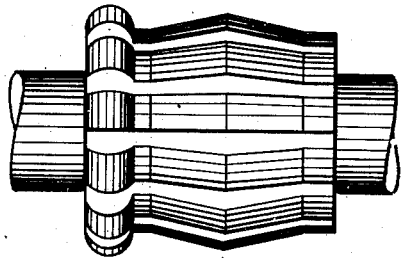
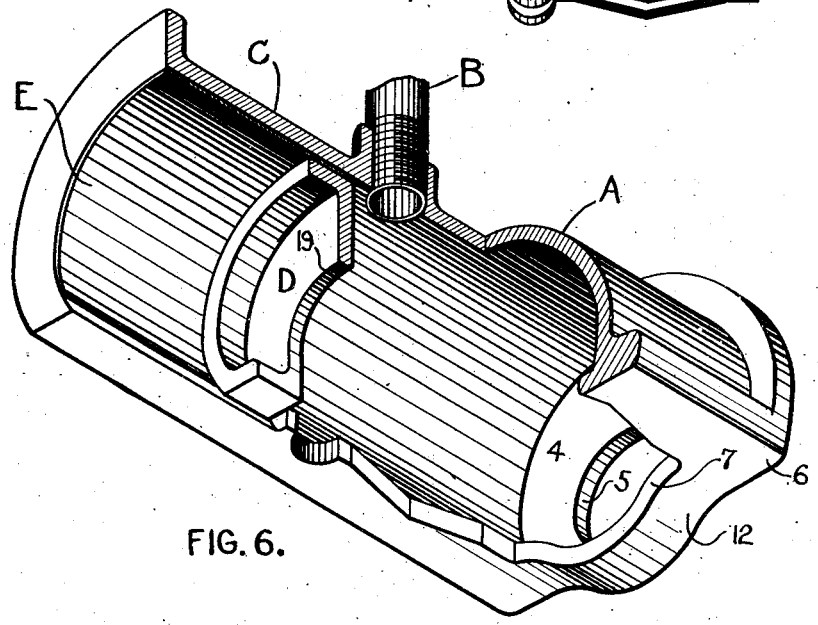
FIG. 6.
Witnesses
E. Silverman
Ma. Halbot
Inventor
Arthur J. Baker
By Wood Wood & Nathan
Attorneys

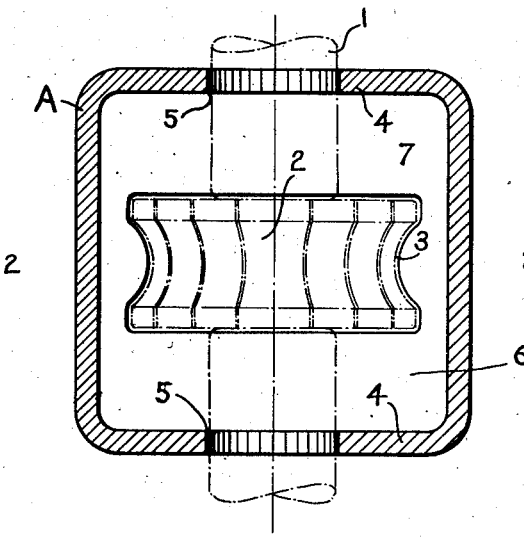
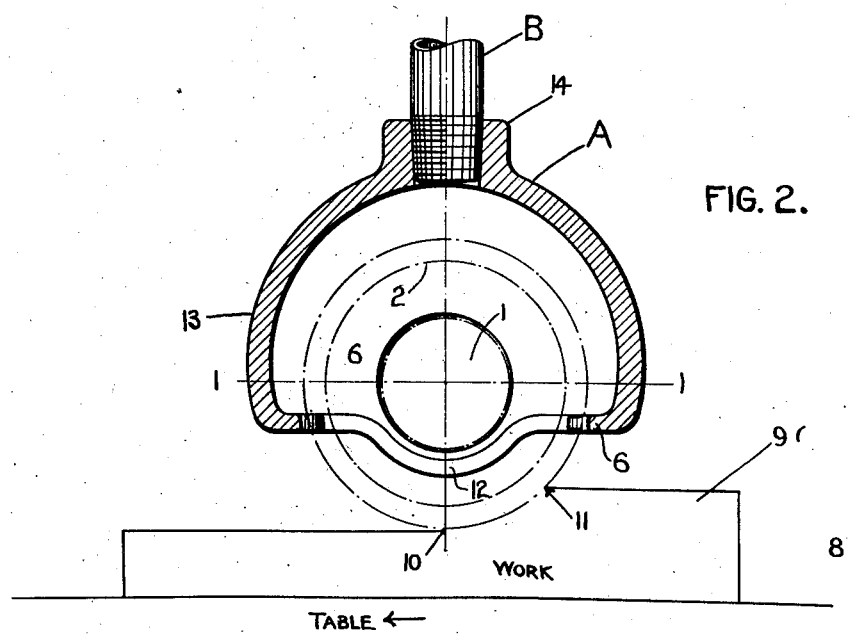

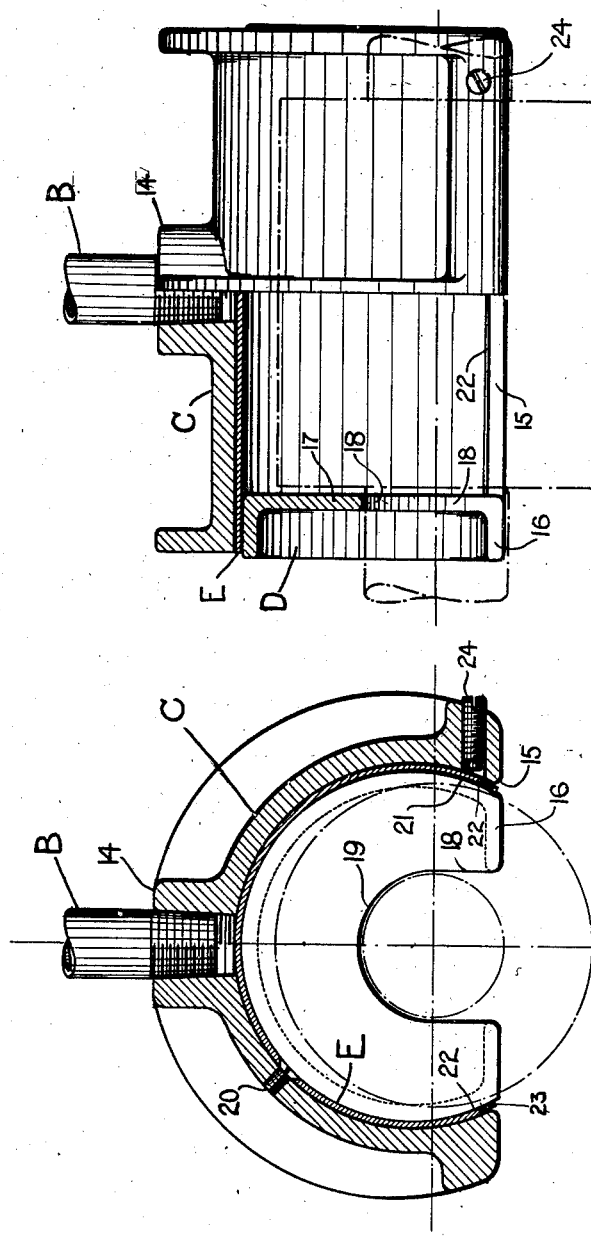

UNITED STATES PATENT OFFICE.

ARTHUR J. BAKER, OF CINCINNATI, OHIO, ASSIGNOR TO THE CINCINNATI MILLING MACHINE COMPANY, OF OAKLEY, CINCINNATI, OHIO, A CORPORATION OF OHIO.

MEANS INCREASING CUTTER EFFICIENCY.

1,093,581.

Specification of Letters Patent. Patented Apr. 14, 1914.

Application filed January 15, 1914. Serial No. 812,188.

*To all whom it may concern:*

Be it known that I, ARTHUR J. BAKER, a subject of the King of Great Britain, and residing at Hyde Park, Cincinnati, in the county of Hamilton and State of Ohio, have invented a new and Improved Means Increasing Cutter Efficiency, of which the following specification is a full disclosure.

This invention proposes an improvement in the means instrumental in lubricating a milling cutter during the tooling operation, and it contemplates an instrumentality applicable in connection with conventional machine tools whereby the tooling capacity of an ordinary milling cutter may be greatly enhanced.

Among the objects contemplated by this invention is to render available an extremely simple structure in the nature of an attachment that may be easily applied to the working elements of a machine tool with the effect that the milling cutter will be enabled to accomplish a greatly increased amount of work, without however limiting the range of the work or diminishing the ordinary operating facility of the machine tool.

One of the primary purposes of this improvement is to enable a milling cutter to be supported by an arbor in the usual manner and to be used for tooling work supported on an exposed or opened underlying table, and at the same time to enable a large portion of the milling cutter to be immersed or submerged in a rapidly flowing quantity of a suitable cooling agent, and without rendering necessary the use of splash-guards of an awkward or interfering character.

Other objects will be in part obvious from the annexed drawings and in part indicated in connection therewith by the following analysis of the invention.

This invention accordingly consists in the features of construction, combination of parts, and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention as set forth in the appended claims, drawings depicting a preferred form have been annexed as a part of this disclosure, and in such drawings, like characters of reference denote corresponding parts throughout all the views, of which:—

Figure 1 is a horizontal section through the axis of a milling cutter, as indicated by line 1—1, of Fig. 2, which is a vertical radial plane section through the device shown by Fig. 1, as through line 2—2 thereof; these figures illustrating a non-adjustable embodiment of this invention which perhaps represents the simplest aspect thereof. Figs. 3 and 4 represent an adjustable embodiment of this invention especially useful when it is desired to utilize milling cutters of different lengths and having a plain contour; Fig. 4 being a side elevation partly broken away to yield an interior view, and Fig. 3 being a radial plane section through line 3—3, Fig. 4. Figs. 5 and 6 respectively show a form of milling cutter and embodiment of this invention especially adapted to accommodate the same; said embodiment being of a special or more universal type and embodying various features and capacities provided by Figs. 1 and 2 on the one hand, and Figs. 3 and 4 on the other hand.

Preceding the detailed description of the illustrated forms of this invention, it should be noted that heretofore it has been a common practice to promote the cutting action of a tool by directing a stream of liquid such as oil or lime-water against the very teeth during their actual cutting or tooling periods. It was believed and universally accepted that this liquid would so far reduce the friction and so far dissipate the heat of friction at the very instant of its formation, that a deterioration of the steel would be prevented to a considerable extent thereby permitting higher speeds to be obtained. After a prolonged close observation I have discovered certain fundamental faults with this theory and I have succeeded in devising an apparatus based on certain new principles and realizing an efficiency heretofore quite unattainable. I have discovered that at the higher tooling speeds the heat is generated in each tooth much more rapidly than the running stream as ordinarily employed can absorb it, with the consequence that the tooth leaves the cut in a heated condition, then travels around the rest of the periphery without a material loss of heat, and soon again starts cutting the work with the consequence that with the addition of the generated heat it again attains a still higher temperature, and the cutting rate must be proportioned to the other conditions so that this tendency to accumulate heat or progressively to increase the temperature will be counterbalanced. By my system, the tooth is not only lubricated and cooled during the actual tooling period to as great an extent heretofore, but it is also refrigerated during the major portion if not all of its idle travel, i. e. when it is returning around the periphery to the starting point again.

By my arrangement, the excess heat remaining in the actual cutting tip and body portion of the tooth after it leaves the cutting period is in process of constant absorption during the return stroke of the tooth so that by the time it again reaches the starting point it will have been very materially reduced in temperature and if not entirely cooled. Consequently, since it does not enter the cutting cycle in a pre-heated state, even though the table feed may be above the normal, there is no tendency for the heat to accumulate or the temperature rise to such a point that the steel is unable to withstand the strains imposed by the work to be done. In carrying out this principle, provision has been made also whereby the refrigerating effect may be accentuated or intensified during the idle or return stroke of the tool, so that this stroke may be accomplished in the very short period of time corresponding to the greater speed of the cutter without unduly exceeding the capacity of the cooling element. That is to say, I not only propose to subject the tooth to a cooling effect by causing it to return while completely immersed in a cooling liquid, but I also propose to effect a rapid interchange of the particles of the liquid with relation to the heated surfaces of the submerged tooth to accentuate the rate of heat absorption, and also effect a rapid and continual replacement and renewal of the cooling medium so that the same may be used at its most efficient normal temperature.

In carrying out what is perhaps the simplest embodiment of my invention, as illustrated in Figs. 1 and 2, 1 indicates the arbor of a machine tool, such as a milling machine, and which is mounted on the machine in any conventional manner, it here being shown as horizontal, and this arbor is power driven in an appropriate manner. A milling cutter 2 indicated in dotted lines is keyed to this arbor so as to be positively rotated thereby at whatever rate of speed may be predetermined. The cutter shown in this instance is ordinarily known as a "formed" cutter in that the cutting edges 3 of its teeth may have a special contour either regular or irregular, as the case may be. For example, this contour may correspond to that of a gear tooth, or to that of any special piece of work to be made, or it may have an ordinary straight line contour. This invention proposes a hood A of a sufficient capacity to circumscribe and receive a large portion of the body of the milling cutter, and the end walls 4 of this hood are provided with circular apertures 5 of a sufficient diameter to receive the arbor 1 with very little clearance, so as to form with the arbor a sufficiently tight or reduced opening so that undue quantities of the cooling medium may not escape. It is desirable to construct this hood in such a manner that it may readily be adapted for cutters of any predetermined contour, and to that end, it is proposed that the bottom wall 6 shall be made relatively thin and shall pass below the arbor, and shall have an aperture 7 especially proportioned and shaped to fit the emerging section of the cutter fairly closely so that undue amounts of lubricant or of the cooling medium may not escape too rapidly. The hood A will be formed initially with a continuous underwall 6, and the aperture 7 will be cut therein, either by means of the cutter tool itself, or in the tool room by other means so as to match the cutter tool. The hood A is easily arranged in its operative relations with the other elements of the machine by first introducing the cutter 2 into its interior and then slipping the hood and cutter onto the end of the arbor so that the arbor passes through the aperture in the cutter as well as the two round end wall apertures of the hood, and then the arbor collars are tightened up in the usual manner, and the work positioned properly with respect to the cutter.

In Fig. 2, 8 indicates a table on which the work 9 is secured and by feeding the table, this work is brought into cutting relation with the teeth of the cutter which will effect a tooling operation from the point indicated by 10 to the point indicated by 11, and the tool will then travel through the long arc from 11 into and through the chamber in the hood A and again to the point 10, and during the major portion of this idle travel or non-tooling arc, my instrumentality will be exercising a refrigerating effect on the tooth. To prevent a non-interference between the work and the hood or the undetached chips and the hood, and at the same time to afford free access to the tooling portions of the cutter, the bottom wall 6 will preferably extend first toward the arbor at a sufficient distance above the work 9, and then may curve around underneath the arbor, as indicated by 12, and then may symmetrically merge with the curved circumscribing wall 13 of the shield A. At an appropriate point in this shield, as for example at its upper side, an apertured boss 14 may be formed which receives the screw threaded end of the pipe B which composes a means for forcing a copious quantity of cooling fluid into said hood whereby the exposed working teeth of the cutter will be maintained in a torrent of heat absorbing fluid and the body of said cutter will be kept submerged in said fluid whereby the teeth which leave the cutting cycle in a heated state will be effectively cooled by being immersed during the greater portion of their peripheral travel in a continuously flowing stream of the cooling medium.

To enable the radical character or capacity of this invention to be better understood, it may here be stated that in the normal use of this structure about ten times as much fluid will be forced through the pipe B into the chamber of the hood A, as has heretofore been used when the fluid was merely directed by a pipe against the working teeth of the cutter without my structure. That is to say, practically the entire body of the cutter, and its entire surface is exposed to the rush of about 15 gallons per minute of the cooling element, which is far in excess of any cooling effect heretofore attainable in this art. It is also to be understood that the above-described structure is intended to be used with and to form a part of the common elements of the conventional working machines such as milling machines. That is to say, the above-described structure is intended to be attached to the delivery end of a pipe leading from an appropriate pump mounted on or in the frame of the machine and which is power-driven by the machine and which receives its supply of the cooling medium which may be lime-water for instance from a suitable well or drainage pocket located below the table of the machine, so that the medium discharged from my hood will flow through suitable channels, conduits and passage-ways from the table to the aforesaid well; thereby providing a continuous system of flowing medium. These elements have not been illustrated because they are conventional and well-known by those skilled in the art.

The adjustable embodiment shown by Figs. 3 and 4 comprises a hood having a sort of semi-cylindrical shape and having an entry port provided by the boss 14 adapted to receive fluid from the pipe B. The shape shown conforms to cutters of a uniform diameter since the curved side wall terminates in the opposing straight edges 15 which are but slightly distant from the adjacent cutter teeth. Provision is here made whereby one or both of the end walls are adjustable so that various cutter lengths may be accommodated. The end wall is here represented by a U shaped member D preferably having an annular-like peripheral portion 16 conforming to the bore of the hood C and a wall-like portion 17 having a U shaped aperture bounded by the tangential edges 18 and the semi-circular edge 19 adapted snugly to encircle the upper half of the arbor, whereby the structure may readily be slipped over an already assembled arbor and cutter. By sliding the member D in an axial direction, it may be brought into very close proximity with the end of the cutter, thus sufficiently restricting the escape of the cooling agent to keep the chamber of the hood full of it, so that all inclosed surfaces of the cutter will be intimately contacted with by the rapidly replaced particles of the medium. Various means may be employed to clamp the sliding member in proper place. Thus, a thin spring-metal shell E may intervene between the outer hood member and the slidable end wall, and this shell may be locked in place as by the screw 20 leaving its marginal portion 21 free and its edges 22 in position to coöperate with the lugs or shoulders 23 of the end members D to restrain rotation thereof. One or more set screws 24 serve to spring the marginal portion 21 inward and cramp the member D against displacement.

The universal embodiment shown by Fig. 6 represents in one structure all of the characteristics peculiar to either Fig. 1 or Fig. 4, that is to say, A represents one end-portion of the hood similar to that shown by Fig. 1 and C represents another end-portion corresponding with that of Fig. 4. The end wall 4 is integral with the end portion A of the hood and it has a closed circular aperture 5 for the arbor and the bottom 6 in part extends under the arbor as indicated by the bridge 12 and in part is cut away to provide the aperture 7 having its edges preferably contoured in close correspondence with the outline of the cutter used, as for example, the cutter shown by Fig. 5. The follower D resembles that shown by Figs. 3 and 4 and it also has the U shaped aperture 19 and is preferably locked in any one of its adjusted positions by the spring shell E as before described. The means instrumental in forcing great quantities of the cooling medium into the hood comprises the inlet pipe B.

Without further elaboration the foregoing will so fully reveal the gist of this invention that others can by applying current knowledge readily adapt it for various applications, without omitting certain features that, from the standpoint of the prior art, fairly constitute essential characteristics of the generic or specific aspects of this invention, and therefore such adaptations should and are intended to be comprehended within the meaning and range of equivalency of the following claims.

Having described my invention, I claim as new and desire to secure by Letters Patent of the United States:—

1. A tooling mechanism of the nature disclosed combining an arbor, a cutter rotated thereby, a hood provided with end-walls and circumscribing a large portion of said cutter and having an opening through which the working-portion of said cutter protrudes, an end-wall of said shell providing an opening through which said arbor extends, and means for admitting a copious quantity of cooling fluid into said hood whereby the exposed working-teeth of the cutter will be maintained in a torrent of heat-absorbing fluid and the body of said cutter will be kept submerged in said fluid.

2. A high-speed tooling-device of the nature revealed combining a rotary milling-cutter, a rotating arbor therefor, a hood having two end-walls each providing an opening through which said arbor extends and also having an aperture through which emerge the working-teeth of the cutter, and means for admitting a copious quantity of cooling-fluid into said hood whereby the teeth will be submerged in a stream of said fluid during the greater portion of their peripheral travel and effectively cooled.

3. A cutter-cooling instrumentality combining a milling cutter having a suitably contoured cutting-periphery, an arbor for rotating it at high-speed, a hood having an opening in its lower periphery through which a portion of said cutter protrudes, the edges of said opening being contoured in close correspondence with the contour of the protruding portion of said cutter, said hood having an end-opening through which said arbor extends, and means whereby a stream of heat-absorbing fluid may flow continuously into said hood.

4. A temperature-controlled cutting-mechanism combining a suitably contoured milling-cutter, an arbor therefor, a hood enveloping said cutter and providing an aperture through which a working-portion of said cutter protrudes in close proximity with the edges of said aperture, said hood also having a round opening through which emerges said arbor in close fitting relation with the edges of said opening, and means for admitting a continuous stream of heat-absorbing fluid into said hood.

5. A low-temperature high-speed tooling-means combining an arbor, a suitably contoured milling-cutter rotatably mounted thereby, a hood encompassing more than 180° of the cutting-periphery of said cutter and providing an aperture through which the working-portion of said cutter protrudes in close proximity with the edges of said aperture, said hood having an end-wall providing a U-shaped slot adapted to fit over said arbor with its semicircular edge-portion in close-fitting concentric relation with the periphery of said arbor, and means for admitting a continuous stream of heat-absorbing fluid into said hood whereby the major-portion of said cutter will be submerged in a flowing body of a cooling-medium.

6. A heat-absorbing metal-cutting instrumentality combining a rotary milling-cutter having a variably-contoured cutting-periphery, a hood inclosing a large portion of said cutter and having an opening through which protrudes a portion of its cutting-periphery, the edges of said opening being variably-contoured in close correspondence with said cutting-periphery in closely-spaced relation therewith, said hood being formed interiorly to clear the teeth of said cutter and constructed to admit the entrance of said rotating means, and means enabling heat-absorbing fluid to enter said hood to absorb the heat generated by the tooling action of the cutter.

In witness whereof, I hereunto subscribe my name, as attested by the two subscribing witnesses.

ARTHUR J. BAKER.

Witnesses:
  SOL EINSTEIN,
  ALBERT F. NATHAN.